United States Patent [19]
Von Starck et al.

[11] 3,738,778
[45] June 12, 1973

[54] ELECTROMAGNETIC CONVEYING TROUGH

[75] Inventors: Axel Von Starck, Remscheid-Luttringhausen; Hans Erwin Gerbig, Remscheid, both of Germany

[73] Assignee: AEG-Elotherm GmbH, Remscheid-Hasten, Germany

[22] Filed: Aug. 10, 1971

[21] Appl. No.: 170,475

[30] Foreign Application Priority Data
Jan. 16, 1971 Germany..............P 21 02 074.6

[52] U.S. Cl. .................................. 417/50, 310/11
[51] Int. Cl. ............................................ H02n 4/20
[58] Field of Search ................ 417/50; 198/41; 310/11

[56] References Cited
UNITED STATES PATENTS
3,486,660  12/1969  Heintz................................ 222/76
3,534,886  10/1970  Von Starck......................... 417/50

FOREIGN PATENTS OR APPLICATIONS
1,203,916  3/1970  Great Britain ..................... 417/50

Primary Examiner—William L. Freeh
Assistant Examiner—John F. Winburn
Attorney—Cushman, Darby & Cushman

[57] ABSTRACT

An electromagnetic conveying trough of the type having an upwardly sloping trough body in which the liquid metal that is to be conveyed is driven upwards by a traveling electromagnetic field generated by an inductor and a gate in the body of the trough for limiting the layer thickness of the liquid metal, the mean direction of the gate opening in a direction perpendicular to the effective component of the traveling electromagnetic field not exceeding 80 percent, and preferably not 75 percent, of the mean width of that portion of the trough that precedes the gate in the direction of axial flow.

7 Claims, 4 Drawing Figures

Inventors
AXEL VON STARCK
HANS ERWIN GIRBIG
Cushman, Darby & Cushman
ATTORNEYS

ELECTROMAGNETIC CONVEYING TROUGH

This invention relates to an electromagnetic conveying trough comprising an upwardly sloping trough body in which the liquid metal that is to be conveyed is driven upwards in open flow against the force of gravity by the traveling electromagnetic field of a polyphase traveling field inductor, and a gate in the body of the trough for limiting the layer thickness of the flowing metal.

A conveying trough of this kind is described in the published specification of German Patent application No. 1,949,982. It is used with particular advantage in automated foundries where the same accurately metered volumes of metal are cast in quick succession. The object of the present invention is to further improve the accuracy of the rate of metal discharge from the upper end of such a trough.

According to the invention, this object is achieved in that the average dimension of the cross section of the gate opening in a direction perpendicular to the effective component of the traveling electromagnetic field does not exceed 80 percent, and is preferably not more than 75 percent of the average width, measured in the same direction, of that portion of the trough which precedes the gate in the direction of metal flow. It is believed that this has the effect of more precisely defining the density of force acting on the liquid in the gate opening and of thereby more precisely controlling the rate of flow.

Besides this advantage the invention also permits choosing a desired conveying capacity that is easily variable within wide limits by the use of a conveying trough designed for a given maximum conveying capacity. It has been found that in electromagnetic conveying troughs the maximum conveying capacity, i.e. the maximum mechanical conveying power related to the effective power consumed by the traveling field inductor, can be reached only if the pitch of the poles of the traveling field inductor is about 3.5 to 6 times the thickness of the refractory lining between the bottom of the trough and the active inductor surface and if the internal width of the trough is about 1.2 to 2 times the pitch of the poles. Since the thickness of the refractory lining cannot be arbitrarily reduced for technological reasons, there is a minimum width of the conveying trough at which, at least approximately, a maximum conveying efficiency can be achieved. Since the size of the gate opening codetermines the rate of flow through the gate, the invention facilitates adapting an electromagnetic conveying trough that has been designed to function with optimum conveying efficiency at a given internal width and width of inductor to operate at different desired rates of flow.

In a preferred embodiment of the invention, particularly when using the trough for pouring equal volumes of metal in serial succession, the gate is located in the region of the last two poles of the traveling field inductor at the upper end of the trough.

According to another important aspect of the invention, at least one of the dimensions of the usually substantially rectangular cross section of the opening of the gate is adjustable, and in a preferred modificaion the internal width of the trough is approximately constant, as is conventional, along the major portion of its length preceding the gate, but immediately preceding the gate the internal width of the trough within a portion of its length not exceeding the pitch and preferably not exceeding half the pitch of the poles of the traveling field inductor contracts to the size of the gate opening. Conveniently the side walls of the trough project to form shoulders at the gate against which more particularly an adjustably movable sliding gate can bear for limiting the layer thickness of the flowing metal.

The invention will be hereinafter more particularly described with reference to the drawings which exemplify the invention.

Figure 1:
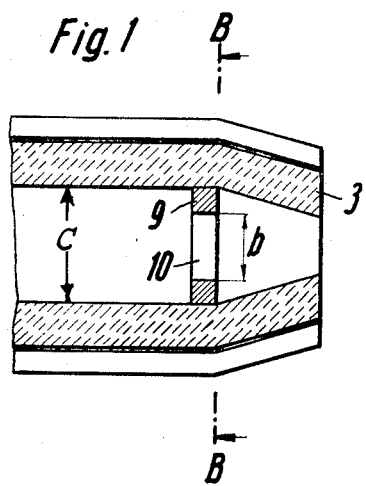
FIG. 1 is the outlet end of an embodiment of the trough, in a section taken on the line A—A in FIG. 2, which shows the same embodiment in cross section (on the line B—B) in FIG. 1.
Figure 2:
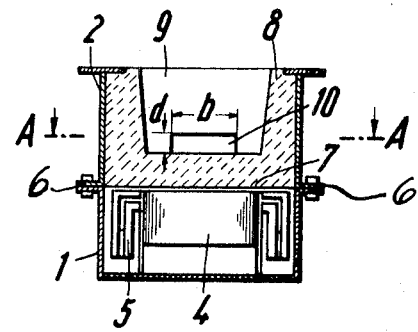
Figure 3:
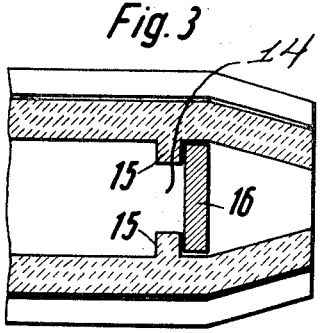
FIGS. 3 and 4 show—in a representation analogous to FIGS. 1 and 2—a different embodiment of the proposed trough in which the gate opening is adjustable, the construction of the trough being otherwise unchanged.

This electromagnetic conveying trough structurally consists of a bottom casing portion as shown in FIG. 2 and an upper casing portion 2. The upper end of this electromagnetic conveying trough terminates in a spout 3, whereas the bottom end, in FIG. 1 further towards the left in the drawing, merges, for instance, into a melting or holding furnace (not shown in the drawing).

The bottom casing portion 1 (FIG. 2) contains a traveling field inductor wound on a slotted laminated core 4, the windings 5 of the inductor being inserted into the slots. The bottom casing portion 1 and the upper portion 2 are interconnected by flanges 6 between which a plate of nonmagnetic steel 7 is clamped to form the cover of the bottom casing portion 1. The refractory body of the trough proper consists of a lining 8 rammed into the upper casing portion 2. In the region of the two last poles at the upper end of the traveling field inductor, a gate 9 is cemented into this lining. The opening 10 of the gate 9 has a rectangular cross section of a thickness $d$ and—in a direction perpendicular to the effective component of the traveling electromagnetic field, i.e. in the illustrated case parallel to the floor of the trough—a width $b$ that does not exceed 80 percent and preferably not 75 percent of the average width $c$ of the trough section preceding the gate in the direction of flow. When the traveling field inductor is switched on, the liquid metal is driven against the gate and slightly backs up against this obstacle. It has been found that the rate at which the metal flows through the opening is in practice independent of the level of the metal bath in the melting or holding furnace.

Figure 4:
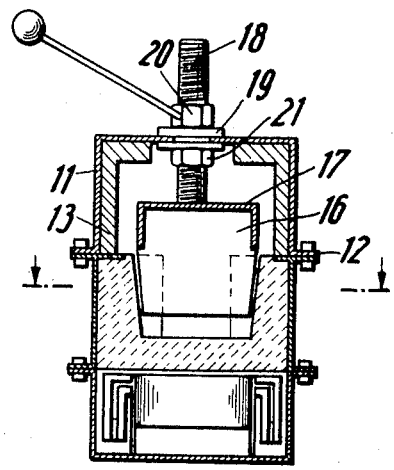

Contrary to FIG. 2, the trough in FIG. 4 is shown including its cover 11 which is connected to the upper casing portion 2 by flanges 12, and which contains a thermally insulating lining 13. The internal width of the trough which is at least approximately constant along the major portion of its length preceding the gate 14 in this embodiment contracts within a length of not more than the pitch and preferably not more than half the pitch of the poles by virtue of the wall portions 15 projecting inwards to the width $b$ of the gate opening. The shoulders facing the trough outlet of these projecting wall portions 15 bear against a sliding gate 16 formed by a refractory brick which by its adjustable elevation determines the height of the opening. The sliding gate 16 is mounted in a holder 17 suspended by a screw 18 in an eye 19 in the cover 11 of the trough and its height can be adjusted by rotation of a nut 20 and counternut 21 and fixed in the adjusted position. This type of gate is preferably used when such a conveying trough is employed in a foundry for pouring consecutive series of castings which differ considerably in weight from series to series.

Many changes and modifications in the above embodiments of the invention can of course be made without departing from the scope of the invention. Accordingly, that scope is intended to be limited only by the scope of the appended claims.

What is claimed is:

1. In an electromagnetic conveying trough comprising an upwardly sloping trough body in which the liquid metal that is to be conveyed is driven upwards in open flow against the force of gravity by the traveling electromagnetic field of a polyphase traveling field inductor, and a gate in the body of the trough for limiting the layer thickness of the flowing metal, the improvement wherein a first mean dimension of width of the cross section of the gate opening in a direction perpendicular to the effective component of the traveling electromagnetic field and perpendicular to the direction of liquid metal flow does not exceed 80 percent of the mean width measured in the same direction of that portion of the trough that precedes the gate in the direction of metal flow and wherein a second mean dimension of height of the cross section of the gate opening in a direction perpendicular to both said first mean dimension and the direction of liquid metal flow is less than the thickness of said metal layer in that portion of the trough that immediately precedes the gate in the direction of metal flow.

2. In an electromagnetic conveying trough as in claim 1, the further improvement wherein the gate is provided in the region of the two last poles of the traveling field inductor.

3. In an electromagnetic conveying trough as in claim 1, the further improvement wherein at least the height dimension of the, at least substantially, rectangular cross section of the gate is adjustable.

4. In an electromagnetic conveyor trough as in claim 1, the further improvement wherein the internal width of the trough is at least approximately constant within the major portion of the length of the trough preceding the gate, but immediately preceding the gate the internal width of the trough within a portion of its length not exceeding the pitch of the traveling inductor contracts to the size of the gate.

5. In a conveyor trough as in claim 1, the further improvement wherein the internal width of the trough within a portion of its length not exceeding half the pitch of the poles contracts to the gate size.

6. In an electromagnetic conveying trough as in claim 1, the further improvement wherein the side walls of the trough project to form shoulders at the gate against which an adjustably movable sliding brick can bear for limiting the layer thickness of the flowing metal.

7. In a trough as in claim 1, the further improvement wherein the cross section of the gate opening in a direction perpendicular to the effective component of the traveling electromagnetic field does not exceed 75 percent of the mean width of the portion of the trough that precedes the gate.

* * * * *